United States Patent [19]

Hsu

[11] 4,232,699

[45] Nov. 11, 1980

[54] HYDRO-MECHANICAL FAILURE DETECTION AND LATCHING APPARATUS

[75] Inventor: William W. Hsu, Burbank, Calif.

[73] Assignee: Textron Inc., Providence, R.I.

[21] Appl. No.: 2,827

[22] Filed: Jan. 12, 1979

[51] Int. Cl.³ .............................................. F16K 31/12

[52] U.S. Cl. ............................................ 137/87; 91/1; 137/554; 137/625.6

[58] Field of Search ............... 91/1, 461; 137/87, 554, 137/625.6

[56] References Cited

U.S. PATENT DOCUMENTS

| | | | |
|---|---|---|---|
| 3,391,611 | 7/1968 | Jenny | 91/459 |
| 3,406,702 | 10/1968 | Jenny | 137/87 |
| 3,570,516 | 3/1971 | Mason | 137/87 |

*Primary Examiner*—Robert G. Nilson
*Attorney, Agent, or Firm*—Nilsson, Robbins, Dalgarn, Berliner, Carson & Wurst

[57] ABSTRACT

A failure detection apparatus useful with a hydraulic system for maintaining fluid pressure signals present in the system to detect predetermined disparity therebetween. The apparatus includes a movable sleeve mounted within a housing and defining a central bore as well as transverse fluid flow passageways therethrough. A piston is mounted within the bore in the sleeve and normally blocks the fluid flow passageways defined within the sleeve. Fluid pressure signals to be monitored for detection of disparity therbetween are applied to opposite ends of the movable sleeve. Upon movement of the sleeve, fluid under pressure is applied through the passageways and through bores provided in the pistons thereby to cause movement of the piston to apply the fluid under pressure to a shut-off valve and a failure indicator mechanism. The piston latches in a limit position to retain the detection device and the shut-off valve in the actuated position. The operational portions of the system are isolated from the fluid pressures in the failure detection portions thereof.

7 Claims, 2 Drawing Figures

HYDRO-MECHANICAL FAILURE DETECTION AND LATCHING APPARATUS

BACKGROUND OF THE INVENTION

It is often desirable to measure or compare two fluid pressure signals to ascertain disparity of a predetermined amount therebetween. If such disparity does occur, it is desirable to isolate the failed system from the remainder of the normally functioning system and to provide a signal which indicates such occurrence. The signal thus developed may be utilized for warning purposes or to operate additional equipment for a desired end result. It is further desired that once such disparity occurs the comparing apparatus is not permitted to return to a position such that the disparity indicating signal may be eliminated, that is the comparing apparatus should be latched once the disparity has been detected.

Prior art apparatus for accomplishing such comparison and latching has, for the most part, included relatively complex electronic or electrical equipment and in those cases where fluid pressure systems have been involved, relatively complex mechanism has been required. In some instances, even though the complex equipment is not required, it has been detected that the equipment does not properly operate in all cases. Such improper operaton may result from differences in fluid leakage within the system as well as the possibility that system pressure may be applied to operational parts of the system resulting in damage thereto.

The best prior art known to applicant at the present time is U.S. Pat. Nos. 3,391,611, 3,406,702, 3,570,516, 1,986,084, 2,983,278.

SUMMARY OF THE INVENTION

A hydro-mechanical failure detection and latching apparatus in accordance with the present invention includes a sleeve slidably mounted within a housing and defining a longitudinal bore and transverse fluid passageway means therethrough. A piston is slidably disposed within the bore and normally blocks the fluid passageway means defined by the sleeve. Means is included for applying first and second pressure signals to be monitored to opposite ends of the sleeve to cause the sleeve to slide responsive to predetermined differences therebetween. Movement of the sleeve permits fluid pressure communication therethrough to move the piston to a limit position.

In accordance with a more specific feature of the present invention there is also provided a shut-off valve which moves responsive to opening of the passageway means to fluid pressure and as a result of such movement, actuates a failure indicating means and may also shut-off a source of fluid under pressure normally provided to the operating apparatus from which the signals to be compared eminate.

Figure 1:
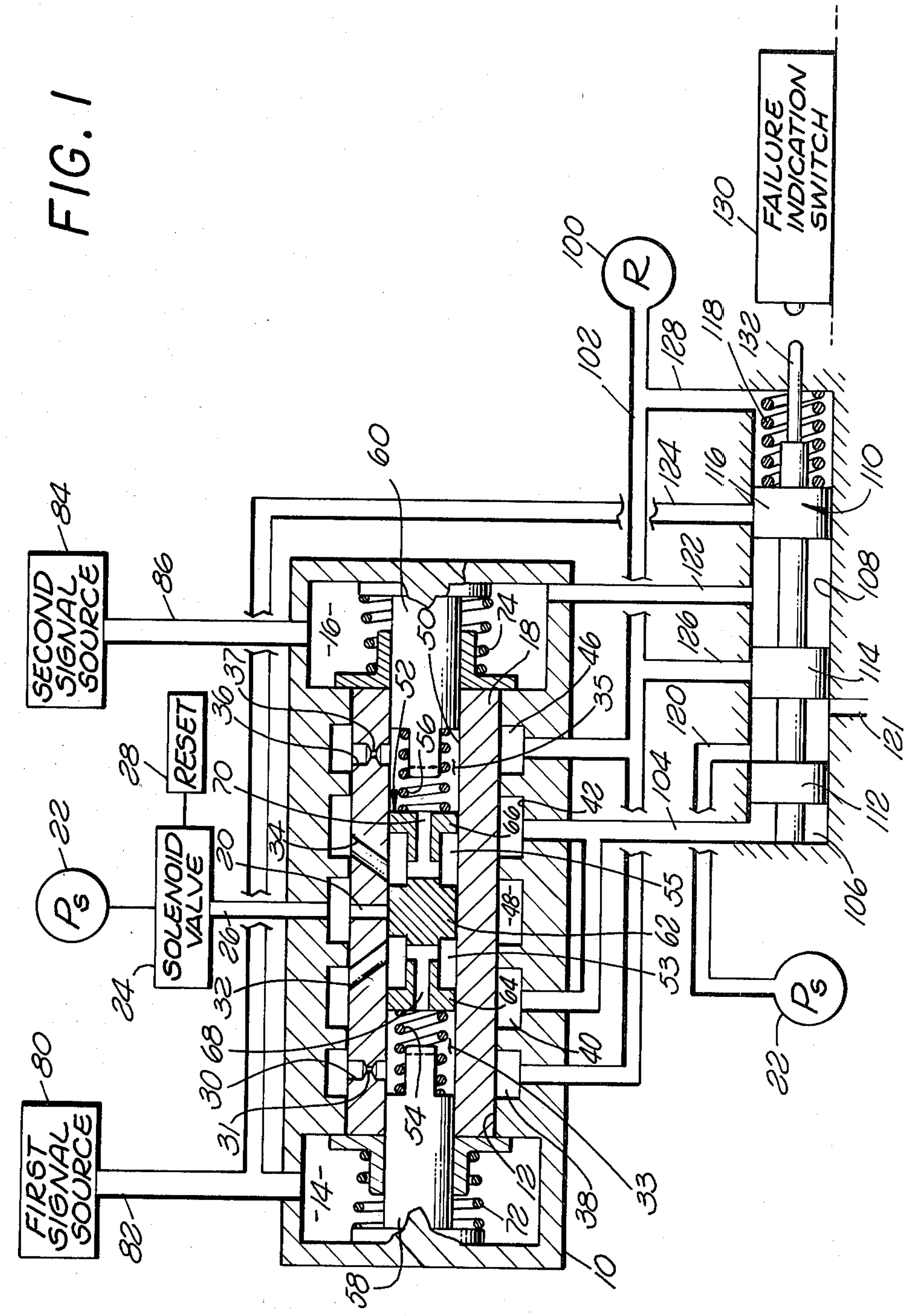
FIG. 1 schematically illustrates the hydromechanical failure detection and latching device in its simplest format.

By reference to FIG. 1 a simplified schematic version of a hydro-mechanical failure detection and latching apparatus constructed in accordance with the principles of the present invention is shown. Generally as pressure signals to be monitored reach a predetermined disparity a sleeve to which the signals are applied moves allowing application of system pressure to a spool. Movement of the spool communicates the system pressure to other devices and the spool is latched in its moved position. As is illustrated in FIG. 1, a housing 10 defines a bore 12 having a pair of enlarged end chambers 14 and 16 at each end thereof. Slidably positioned within the bore 12 is a sleeve 18. The sleeve 18 defines a passageway 20 which communicates with fluid under pressure ($P_s$) from a source 22 thereof through a solenoid valve 24 and conduit means 26 extending through the housing 10. A reset means 28 is provided to deactivate the solenoid valve 24 for purposes which will be described more fully hereinafter. Additional fluid passageways 30, 32, 34 and 36 are also provided through the sleeve 18 and each communicates with an annular groove 38, 40, 42 and 46, respectively, formed in the body 10. It will also be noted that an additional annular groove 48 also communicates with the passageway 20 to which the fluid under pressure $P_s$ is connected.

The sleeve 18 also defines a bore 50 therethrough. Slidably positioned within the bore 50 is a piston 52. The piston 52 is centered in the bore 50 by a pair of springs 54 and 56 which are held in position by the spring guides 58 and 60, respectively. It will be noted that the piston 52 contains a center land 62 and a pair of end lands 64 and 66 with a reduced diameter portion between the center lands 62 and each of the end lands, thus defining a pair of central chambers 53 and 55. Reentrant bores 68 and 70 are provided in the end lands 64 and 66, respectively with transverse bores communicating therewith and into the central chambers 53 and 55 defined by the reduced diameter portion between the center lands and the end lands. It will be noted that the center land 62 normally blocks the passageway 20 through which the fluid pressure is connected.

End chambers 33 and 35 are defined respectively between the end land 64 and the spring guide 58 and the end land 66 and the spring guide 60.

The spring guides 58 and 60 each also retain in position a spring 72 and 74, respectively.

A first pressure signal from a first signal source 80 is connected through a conduit 82 to the end chamber 14 while a second pressure signal from a second source 84 thereof is connected by a conduit 86 to the end chamber 16.

When the piston 52 is in the position shown in FIG. 1 blocking the passageway 20, system return 100 is connected by way of conduit 102 to the annular grooves 38 and 46 and from there through the passageways 30 and 36 to the chambers 33 and 35. System return is further applied through the reentrant bores 68 and 70 to the central chambers 53 and 55 from which it is also connected to the annular grooves 40 and 42 through the passageways 32 and 34. The annular grooves 40 and 42 are also connected through the conduit 104 to the end chamber 106 defined by a bore 108 within which there is disposed a valve means 110 having lands 112, 114 and 116 disposed therein. The valve 110 is spring loaded toward the left as viewed in FIG. 1 by the spring 118.

It will be noted that the bore 108 also has connected thereto a plurality of conduits as follows: a conduit 120 which is connected to the source 22 of system pressure ($P_s$), a conduit 122 which connects to the second pressure signal from second source 84, a conduit 124 which connects the first pressure signal from the first source 80, as well as the conduits 126 and 128 which are also connected to system return 100.

A failure indication means such as a switch 130 is provided. When the valve 110 moves toward the right, as viewed in FIG. 1, the rod 132 will engage the switch 130 thus providing a signal which may be used for any purpose desired and as will be more fully described hereinafter.

In operation of the device as illustrated in FIG. 1, the pressure signals from the sources 80 and 84 are applied simultaneously to the chambers 14 and 16. The pressure signals in turn are applied to each end of the sleeve 18 positioned within the bore 12. The springs 72 and 74 provide a predetermined preload to the sleeve 18 thereby preventing any movement of the sleeve until such a time as a threshold level is reached. The threshold level is determined by the force of the springs 72 and 74. When the signal pressure differential reaches the threshold level the sleeve moves to the left or right as viewed in FIG. 1 depending upon the larger of the two pressure signals applied to the chambers 14 and 16.

Assuming for purposes of description that the larger pressure signal is from the second source 84 the sleeve moves toward the left as viewed in FIG. 1. As the sleeve moves toward the left the passageway 20 is carried toward the left but remains in communication with the annular groove 48 which communicates fluid pressure from source 22 to the passageway 20. When the passageway 20 reaches the central chamber 53 between the lands 62 and 64 system fluid pressure ($P_S$) is applied through the reentrant bore 68 and to the end chamber 33. The restriction orifice 31 in the passageway 30 creates a pressure drop thereacross thereby generating a pressure in the end chamber 33 within which the spring 54 is positioned. This force operates against the land 64 and moves the piston 52 toward the right until it stops againt the spring guide 60 thus positioning the piston in a first limit position. In this limit position fluid pressure maintains its communication from the source 22 through the conduit passageway 20, the reentrant bore 68, the chamber 33, the passageway 30 and from there to system return 100. At the same time, the build-up in pressure which occurs as a result of the restriction orifice 31 is also communicated through the passageway 32 and the annular groove 40 to the conduit 104 and into the chamber 106. The build-up in pressure in chamber 106 operates against the land 112 and translates the slide valve 110 toward the right as viewed in FIG. 1 against the force of the spring 118. Such movement of the valve 110 accomplishes several results.

First, the land 112 blocks communication of the conduit 120 with the bore 108 thereby precluding the application of fluid pressure ($P_S$) from the source 22 through the conduit 121 to any apparatus to which it may be connected and in turn system return 100 is connected through conduit 126 thereto. Second, the first and second signal sources 80 and 84 are connected together in the space between land 114 and 116 thereby effectively bypassing the apparatus generating these two signal sources and rendering such apparatus inoperable. It will also be noted that since the chambers 14 and 16 are effectively connected together that the sleeve 18 will return to the position shown in FIG. 1. However, the piston 52 will remain latched in its first limit position because system pressure remains applied to the central chamber 53. Third, and as above indicated, when such translation occurs the rod 132 also contacts the failure indication switch 130 to provide an output signal which typically is of an electrical nature that may be utilized to warn the operator of the device or to effectuate other activities as may be required in a particular application.

If the signal from the first source 80 is the greater of the two exactly the opposite movement of the sleeve occurs and the piston will move to the left and stop against the guide 58 in its second limit position with similar results as a result of the restriction orifice 37 in the passageway 36.

After the indication of a particular failure has occurred the operator may, if desired, check the unit to be certain that a malfunction has occurred in the device generating the first and second signals. Such resetting may be accomplished by activating the reset means or switch 28 which causes the solenoid valve to remove the supply of system pressure 22 from the passageway 20. When such occurs the springs 54 and 56 again center the piston 52 into the position shown in FIG. 1, thereby blocking the supply of system pressure in the manner above-referred to. Upon removal of the fluid pressure ($P_S$) from source 22 the spring 118 returns the valve 110 to the position shown in FIG. 1 thereby once again applying the fluid pressure 22 through the conduit 121 to the original desired operational status. Under these ciurcumstances the sources 80 and 84 again will generate the desired signals which will have the effect of applying the same to the chambers 14 and 16 in accordance with normal operation. If, in fact, a malfunction has occurred thereby generating the signals from the sources 80 and 84 having the disparity to create a threshold differential equal to the threshold pressure, the entire system will operate as above indicated. Thus, the piston 52 will be latched in one of its limit positions and valve 110 will be translated thereby cutting off the system supply source, bypassing the two signals as well as providing the failure indication signal again thereby clearly indicating a failure in that part of the system containing the pressure signal source 80 and 84.

Figure 2:
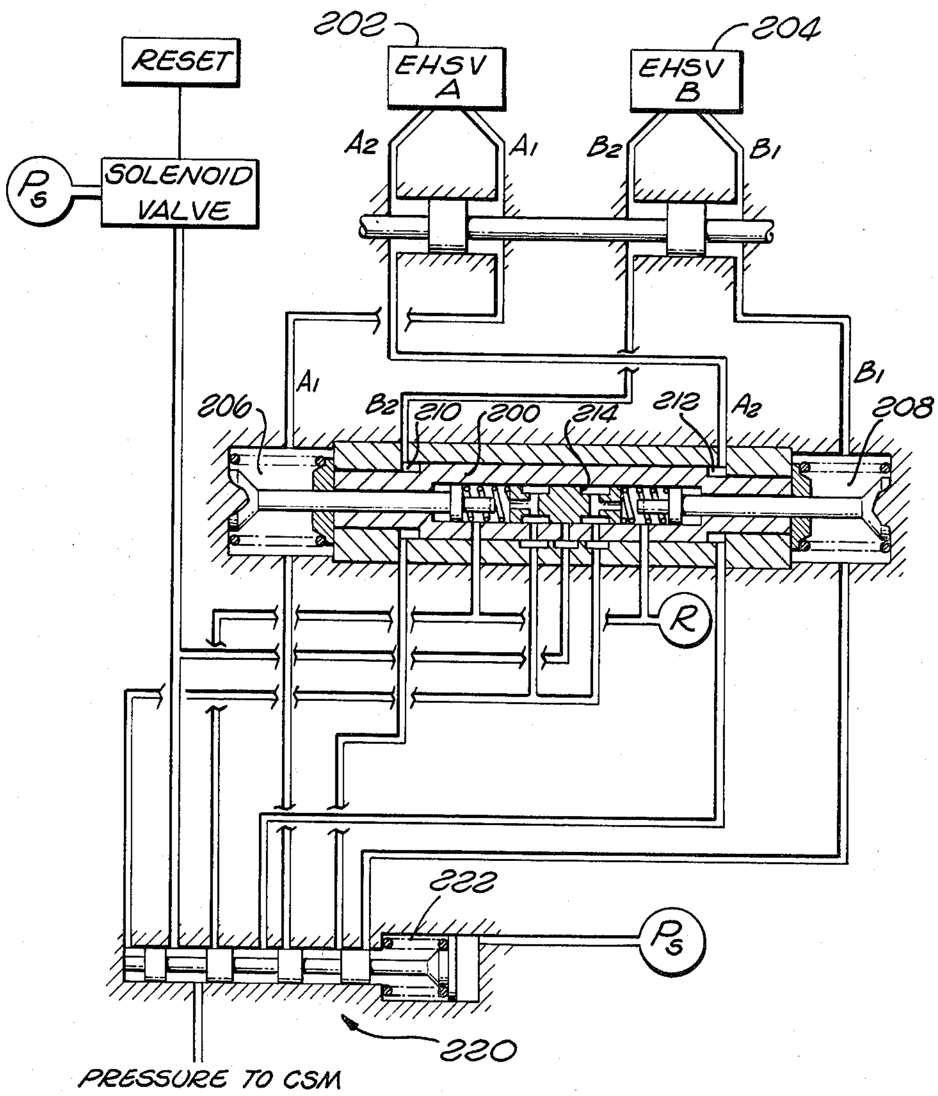
FIG. 2 schematically illustrates an alternative embodiment thereof.

At times it becomes desirable to compare a plurality of pressure signals and by reference to FIG. 2, there is disclosed an implementation of apparatus constructed in accordance with the principles of the present invention for that purpose. As is seen in FIG. 2, the output pressure signals appearing across a pair of actuators are compared to detect a predetermined discrepancy therebetween in a manner similar to that discussed with respect to the apparatus of FIG. 1. As will be noted by investigation of the apparatus disclosed in FIG. 2, the pressure signals from one side of each of the actuators are compared to each other while the pressure signals form the opposite side of each of the actuators are compared to each other by applying the pressure signals across the movable sleeve as hereinabove described. As will be appreciated by those skilled in the art the two electrohydraulic servovalves (EHSV A and EHSV B) will have the same signals applied thereto and under normal operating conditions will generate equal signals for application to the two actuators. Only a general description of the apparatus and its operation will be provided since the detailed description was set forth with respect to the apparatus contained in FIG. 1.

First and second electrohydraulic servovalves 202 and 204, designated as EHSV A and EHSV B, respectively, are provided for generating pressure signals which will be applied to the actuators and then compared to detect any discrepancies therebetween. Typically the EHSV's A and B will be provided with identical input signals and will, under normal operating circumstances, provide identical output signals for operation of devices connected thereto such as the actuators. The movable sleeve 200 is positioned and designed so as to provide chambers 206 and 208 at opposite ends thereof to receive output signals A1 and B1. Also provided are additional annular chambers 210 and 212 to which are applied the output signals B2 and A2. It will thus be seen that the output signals A1 and B1 are compared across equal area portions of the sleeve 200 while the output pressure signals A2 and B2 are also compared across equal area portions of the sleeve 200. It will be appreciated by those skilled in the art that when the pressure difference between A1 plus B2 and A2 plus B1 is sufficiently great enough to exceed the predetermined threshold level, sleeve 200 will move thereby providing communication of system pressure ($P_S$) to move the piston 214 with the same results as previously described. The slide valve 220 operates similar to that shown and described with respect to FIG. 1 with the exception that the valve is also designed to detect system pressure ($P_S$) failure and if such does occur the spring 222 will move the slide valve toward the right as is viewed in FIG. 2 as if there had been a failure of one of the valves EHSV A or EHSV B. In addition thereto, it will be appreciated that the valve shown makes provision for bypassing or short circuiting the output signals A1 and A2 from EHSV A as well as B1 and B2 from EHSV B.

As will be recognized by those skilled in the art the system of the present invention may also be used in a redundant hydraulic system. For example, signals A1 and A2 from one hydraulic system within a control system may be compared while B1 and B2 are likewise compared. The threshold would necessarily be set somewhat higher but otherwise the apparatus of the present invention would function as described in conjunction with FIG. 1.

In all other respects the construction and operation of the apparatus illustrated in FIG. 2 is the same as that illustrated in FIG. 1 and thus any additonal detailed description is not believed to be required herein.

What is claimed is:

1. Hydromechanical failure detection and latching apparatus comprising:

(A) a housing;

(B) a sleeve defining a bore longitudinally therethrough and slidably disposed in said housing;

(C) means for applying first and second pressure signals to be monitored to opposite ends of said sleeve for causing said sleeve to slide responsive to a predetermined difference between said signals;

(D) a piston slidably disposed within said bore in said sleeve and movable therein between first and second limit positions;

(E) spring means centering said piston centrally of said bore in said sleeve;

(F) said piston defining reentrant bores at each end thereof and separated by a central portion of said piston;

(G) a source of fluid under pressure; and (H) passageway means for communicating said fluid pressure from said source through one of said reentrant bores to an end area of said piston responsive to sliding of said sleeve, said central portion of said piston normally blocking said passageway means, said piston moving to one of its said limit positions responsive to application of said source of fluid pressure to an end of said piston.

2. Apparatus as defined in claim 1 which further includes means for preloading said sleeve to preclude movement thereof until said predetermined difference between said signals is applied across said sleeve.

3. Apparatus as defined in claim 2 wherein said preload means is a spring positioned at each end of said sleeve.

4. Apparatus as defined in claim 4 which further includes valve means, said passageway means being coupled to said valve means, said valve means being responsive to said source of fluid under pressure transmitted only through said piston for providing a failure indication signal.

5. Apparatus as defined in claim 4 wherein said valve means further includes means for bypassing said first and second pressure signals to be monitored when said valve means responds to said source of fluid under pressure.

6. Apparatus as defined in claim 4 which further includes switch means, said valve means activating said switch means when said valve means responds to said fluid pressure.

7. Apparatus as defined in claim 1 which further includes means for isolating said pressure signals to be monitored from said source of fluid under pressure.

* * * * *